US012117149B1

(12) United States Patent
Ma

(10) Patent No.: US 12,117,149 B1
(45) Date of Patent: Oct. 15, 2024

(54) CONNECTING BOX FOR ROAD LAMP

(71) Applicant: Shenzhen Hitoplux Optoelectronic Co., Ltd., Shenzhen (CN)

(72) Inventor: Yingshan Ma, Xiangtan Hunan (CN)

( * ) Notice: Subject to any disclaimer, the term of this patent is extended or adjusted under 35 U.S.C. 154(b) by 0 days.

(21) Appl. No.: 18/625,298

(22) Filed: Apr. 3, 2024

(51) Int. Cl.
*F21V 23/00* (2015.01)
*F21S 8/08* (2006.01)
*F21V 23/06* (2006.01)
*F21V 31/00* (2006.01)
*F21W 131/103* (2006.01)

(52) U.S. Cl.
CPC ............ *F21V 23/002* (2013.01); *F21S 8/086* (2013.01); *F21V 23/06* (2013.01); *F21V 31/005* (2013.01); *F21W 2131/103* (2013.01)

(58) Field of Classification Search
CPC ........ F21S 8/06; F21V 31/005; F21V 21/002; F21V 21/26; F21V 21/28; F21V 21/29; F21V 21/30
See application file for complete search history.

(56) References Cited

FOREIGN PATENT DOCUMENTS

| | | | | |
|---|---|---|---|---|
| CN | 108429042 A | * | 8/2018 | ......... H01R 13/2428 |
| CN | 109687214 A | * | 4/2019 | ........... H01R 13/502 |
| CN | 111224285 A | * | 6/2020 | |

OTHER PUBLICATIONS

Innovation Q+ NPL Search (Year: 2024).*

* cited by examiner

*Primary Examiner* — Anabel Ton

(57) ABSTRACT

Disclosed is a connecting box for a road lamp. The connecting box includes a first half housing for mounting and connection to a lamp body and a second half housing for mounting and connection to a lamp post. The second half housing and the first half housing are spliced together in an openable manner and enclose to form an accommodating cavity, and a quick wire connector is arranged in the accommodating cavity. This product is composed of the first half housing and the second half housing. In the process of use, the first half housing and the second half housing can be mounted on the lamp body and the lamp post respectively to realize easy mounting of the lamp. Moreover, the quick wire connector is arranged for cooperation, such that flexible wire replacement can be realized, and fast wiring is realized.

7 Claims, 5 Drawing Sheets

CONNECTING BOX FOR ROAD LAMP

TECHNICAL FIELD

The present disclosure relates to the technical field of connecting boxes, and in particular to a connecting box for a road lamp.

BACKGROUND

A road lamp is a lighting device placed on a road to provide necessary visibility for vehicles and pedestrians at night. The road lamp can improve traffic conditions, reduce driver fatigue, improve road traffic capacity and ensure traffic safety. A garden lamp, a landscape lamp and the road lamp form a three-dimensional lighting mode, which enhances a road decoration effect and beautify the city night scene, and also can make up for the shortcoming of road lamp illumination.

For a traditional road lamp, in terms of wiring of the whole lamp, an alternating current (AC) line is connected between a lamp post and the whole lamp body. Wiring can be operated under assistance of a plurality of persons. The whole lamp needs to be stabilized during wiring, and the operation cannot be performed by a single person, which brings inconvenience to mounting of the road lamp. Therefore, it is necessary to study a solution to solve the above problem.

SUMMARY

In view of this, aiming at the defect of the prior art, the main objective of the present disclosure is to provide a connecting box for a road lamp, which can effectively solve the problem that mounting of an existing road lamp can't be operated by a single person, resulting in inconvenient mounting.

To achieve the above objective, the present disclosure employs the following technical solutions:

A connecting box for a road lamp includes a first half housing for mounting and connection to a lamp body and a second half housing for mounting and connection to a lamp post. The second half housing and the first half housing are spliced together in an openable manner and enclose to form an accommodating cavity, and a quick wire connector is arranged in the accommodating cavity.

Preferably, one side of the first half housing is provided with shaft holes, correspondingly, one side of the second half housing is provided with rotating shafts, and the rotating shafts are rotationally inserted into the shaft holes.

Preferably, two shaft holes are arranged at an interval from top to bottom, correspondingly, two rotating shafts are also arranged from top to bottom, and the two rotating shafts are rotationally inserted into the two shaft holes respectively.

Preferably, the other side of the first half housing is provided with a fixing hole, correspondingly, the other side of the second half housing is provided with a first screw, and the first screw is connected to the fixing hole for fixation in a screwed manner.

Preferably, the first half housing is provided with a plurality of second screws for being fixed to the lamp body.

Preferably, a wire passing hole is provided in an outer side surface of the first half housing, the wire passing hole is in communication with the accommodating cavity, and a first waterproof ring is arranged at a periphery of the wire passing hole.

Preferably, a second waterproof ring is sandwiched between the second half housing and the first half housing.

Preferably, the second half housing is provided with waterproof connectors, and the waterproof connectors are in communication with the accommodating cavity.

Compared with the prior art, the present disclosure has obvious advantages and beneficial effects. Specifically, the above technical solutions show that:

This product is composed of the first half housing and the second half housing. In the process of use, the first half housing and the second half housing can be mounted on the lamp body and the lamp post respectively to realize easy mounting of the lamp. Moreover, the quick wire connector is arranged for cooperation, such that flexible wire replacement can be realized, and fast wiring is realized. An operation can be made by a single person, which brings convenience to mounting of the road lamp.

DESCRIPTION OF REFERENCE NUMERALS

Figure 1:
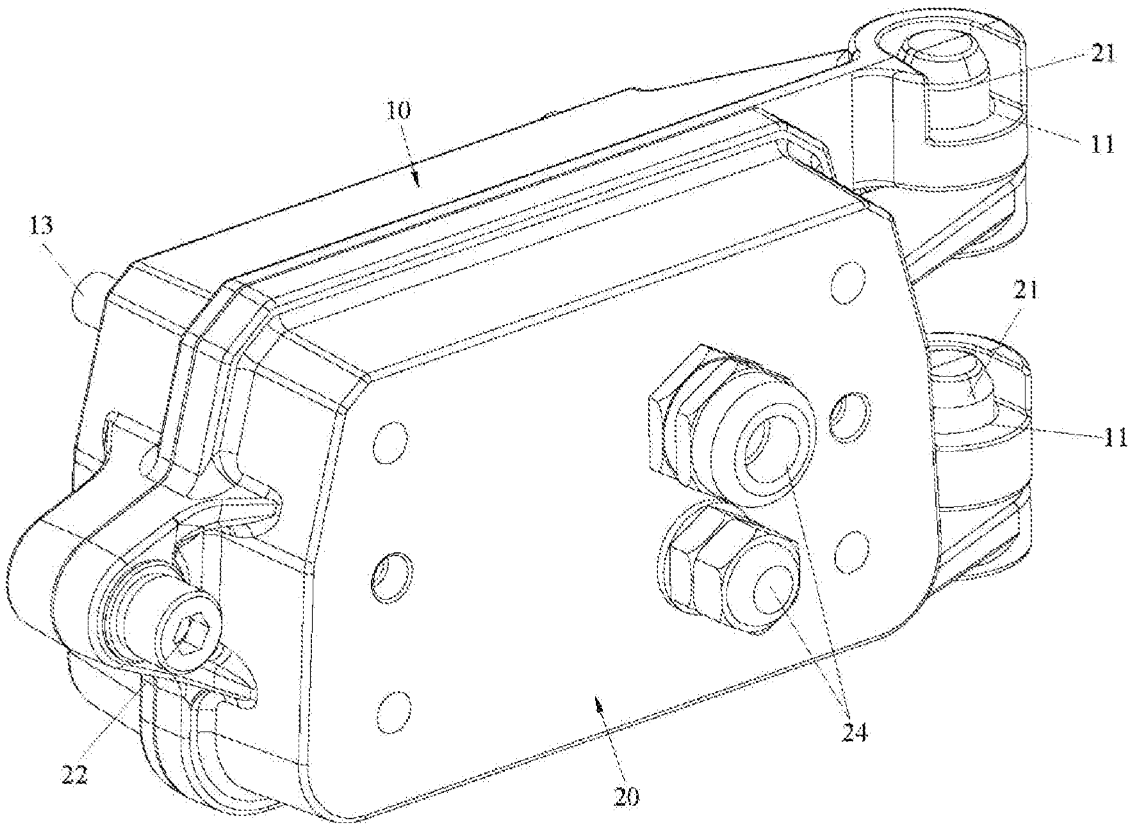
FIG. 1 is a perspective schematic diagram of assembly of a preferred example of the present disclosure.
Figure 2:
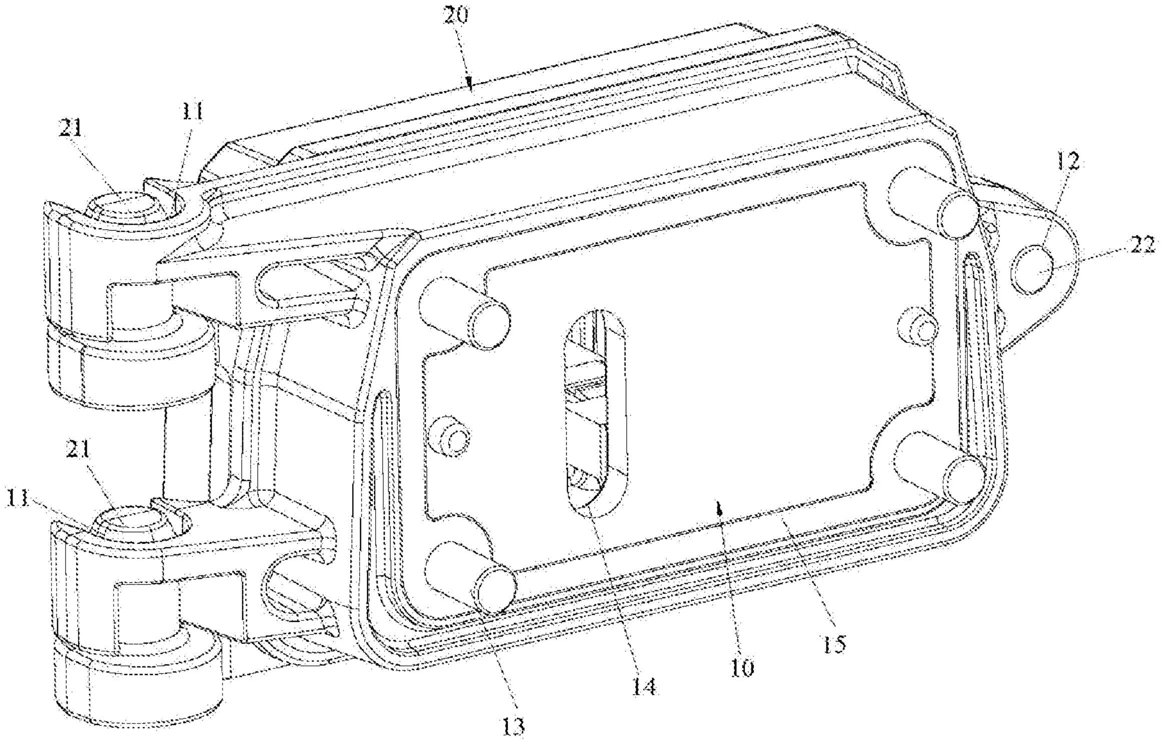
FIG. 2 is a perspective schematic diagram of assembly from another view of a preferred example of the present disclosure.
Figure 3:
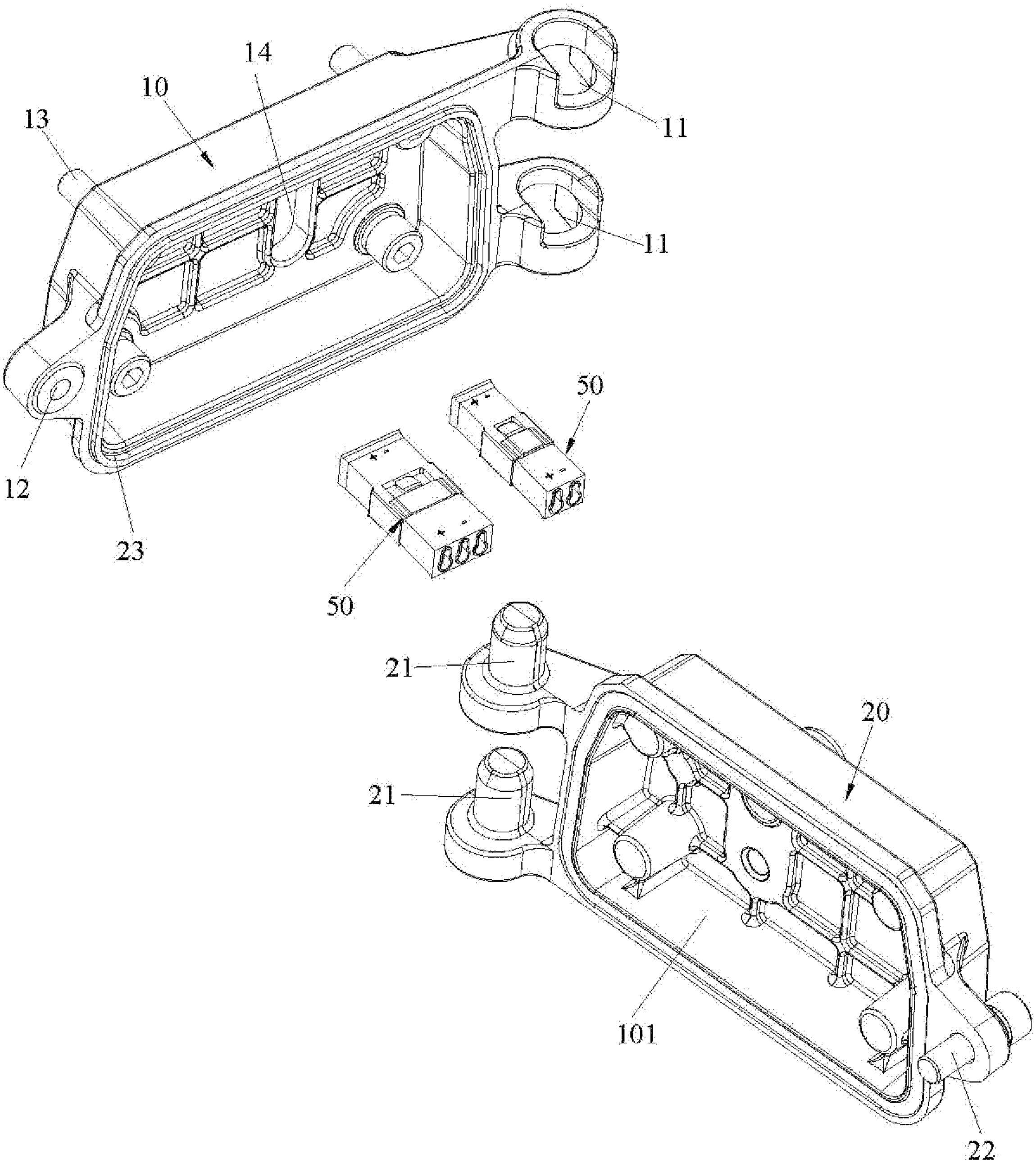
FIG. 3 is an exploded diagram of a preferred example of the present disclosure.

10, first half housing 11, shaft hole
12, fixing hole 13, second screw
14, wire passing hole 15, first waterproof ring
20, second half housing 21, rotating shaft
22, first screw 23, second waterproof ring
24, waterproof connector 101, accommodating cavity
30, lamp body 40, lamp post
50, quick wire connector

DETAILED DESCRIPTION OF THE EMBODIMENTS

FIGS. 1-5 show a specific structure of a preferred example of the present disclosure and includes a first half housing 10 and a second half housing 20.

The first half housing 10 is used for mounting and connection to a lamp body 30. One side of the first half housing 10 is provided with shaft holes 11, two shaft holes 11 are arranged at an interval from top to bottom, correspondingly, and the other side of the first half housing 10 is provided with a fixing hole 12. Moreover, the first half housing 10 is provided with a plurality of second screws 13 for being fixed to the lamp body 30. Additionally, a wire passing hole 14 is provided in an outer side surface of the first half housing 10, and a first waterproof ring 15 is arranged at a periphery of the wire passing hole 14.

Figure 4:
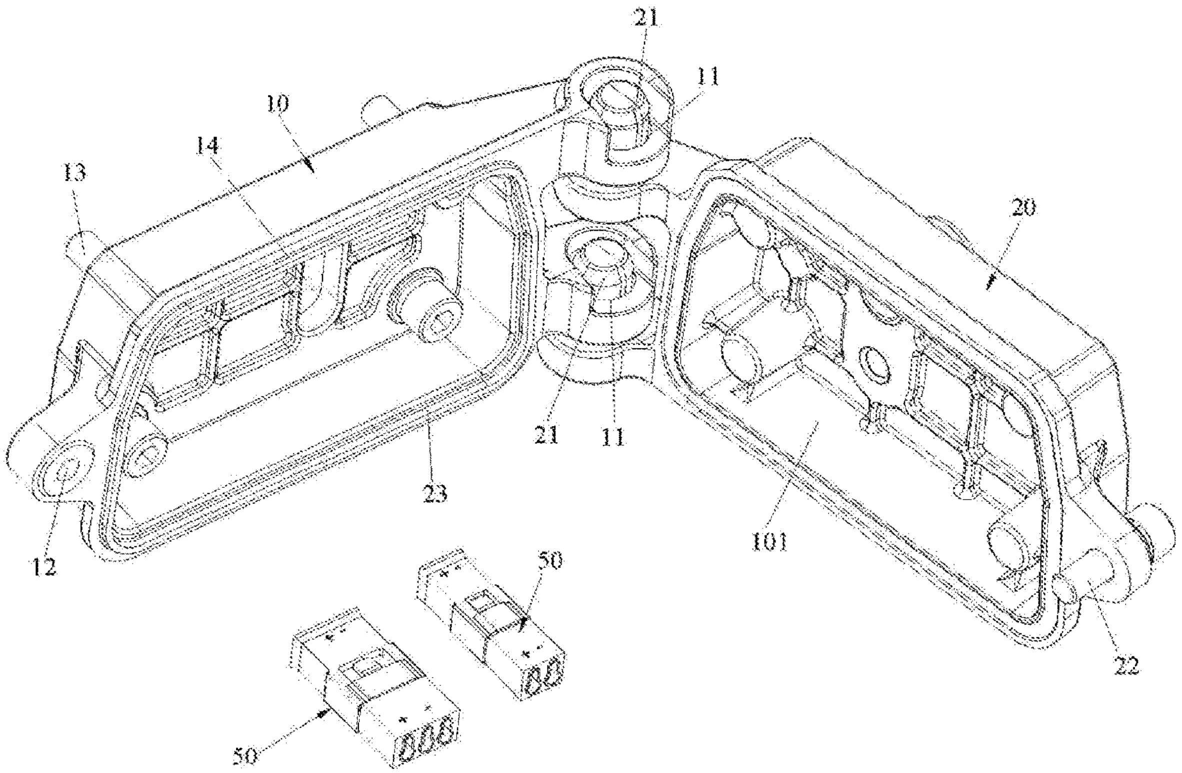
FIG. 4 is a schematic diagram in an open state of a preferred example of the present disclosure.
Figure 5:
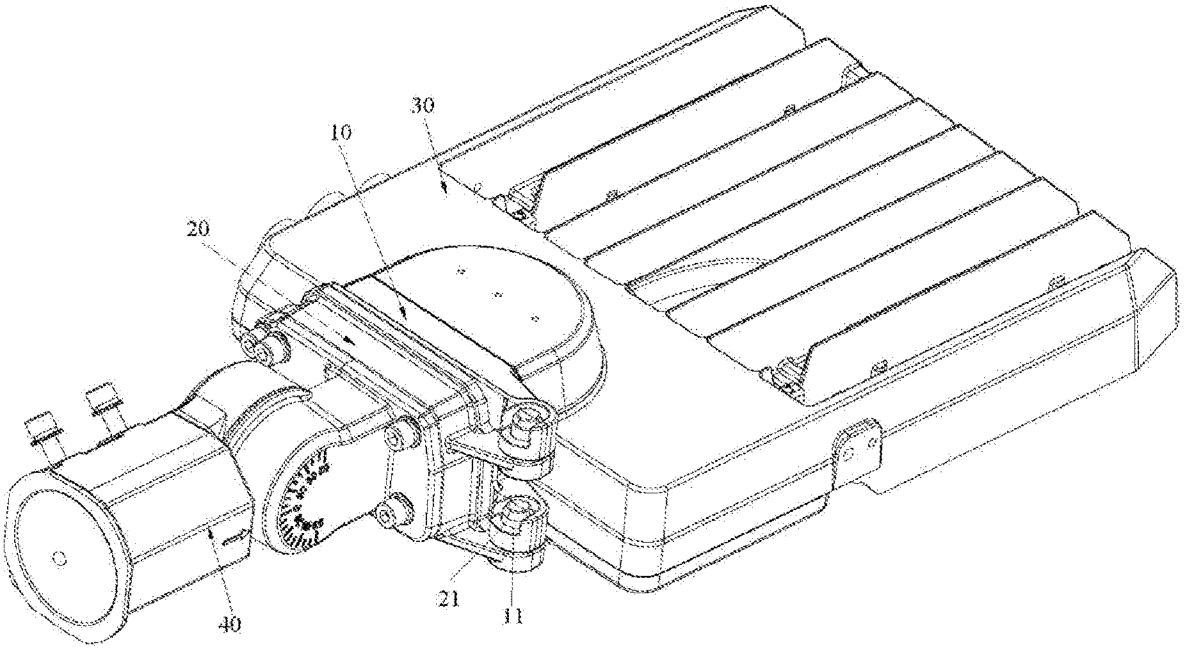
FIG. 5 is a schematic diagram in a use state of a preferred example of the present disclosure.

The second half housing 20 is used for mounting and connection to a lamp post 40. The second half housing 20 and the first half housing 10 are spliced together in an openable manner and enclose to form an accommodating cavity 101, and a quick wire connector 50 is arranged in the accommodating cavity 101. In this example, the wire passing hole 14 is in communication with the accommodating cavity 101, one side of the second half housing 20 is provided with rotating shafts 21, and the rotating shafts 21 are rotationally inserted into the shaft holes 11. Furthermore, two rotating shafts 21 are also arranged from top to bottom, and the two rotating shafts 21 are rotationally inserted into the two shaft holes 11 respectively so as to limit left and right kinematic pairs and be connected into a hinge rotating shaft structure. Moreover, the other side of the second half housing 20 is provided with a first screw 22, and the first screw 22 is connected to the fixing hole 12 for fixation in a screwed manner. Additionally, a second waterproof ring 23 is sandwiched between the second half housing 20 and the first half housing 10. Additionally, the second half housing 20 is provided with waterproof connectors 24, and the waterproof connectors 24 are in communication with the accommodating cavity 101 so as to realize a waterproof effect on an exposed wire. A using method of this example is described in detail as follows:

During use, as shown in FIG. 4, the first half housing 10 is mounted and connected to the lamp body 30 by means of the second screws 13. Moreover, the IP65 waterproof requirement of the lamp body 30 is achieved by pressing the first waterproof ring 15 to deform, and the second half housing 20 is mounted and connected to the lamp post 40, such that easy mounting of the lamp can be realized. By loosening the first screw 22, the second half housing 20 and the first half housing 10 can be opened, and then the quick wire connector 50 can be used for simply and quickly connecting an outgoing wire of the lamp body 30 with the exposed wire. After wiring is completed, the second half housing 20 and the first half housing 10 are closed, and the first screw 22 is tightened.

The design focus of the present disclosure is: this product is composed of the first half housing and the second half housing. In the process of use, the first half housing and the second half housing can be mounted on the lamp body and the lamp post respectively to realize easy mounting of the lamp. Moreover, the quick wire connector is arranged for cooperation, such that flexible wire replacement can be realized, and fast wiring is realized. An operation can be made by a single person, which brings convenience to mounting of the road lamp.

The technical principle of the present disclosure has been described above in conjunction with particular examples. These descriptions are intended only to explain the principle of the present disclosure and should not be construed in any way as limiting the protection scope of the present disclosure. Based on the explanation herein, those skilled in the art can think of other particular embodiments of the present disclosure without creative efforts, and these embodiments will fall within the protection scope of the present disclosure.

What is claimed is:

1. A connecting box for a road lamp, comprising:

a first half housing for mounting and connection to a lamp body and a second half housing for mounting and connection to a lamp post;

wherein the second half housing and the first half housing are spliced together in an openable manner and enclose to form an accommodating cavity, and a quick wire connector is arranged in the accommodating cavity;

wherein one side of the first half housing is provided with shaft holes, correspondingly, one side of the second half housing is provided with rotating shafts, and the rotating shafts are rotationally inserted into the shaft holes.

2. The connecting box for a road lamp according to claim 1, wherein two shaft holes are arranged at an interval from top to bottom, correspondingly, two rotating shafts are arranged from top to bottom, and the two rotating shafts are rotationally inserted into the two shaft holes respectively.

3. The connecting box for a road lamp according to claim 1, wherein the other side of the first half housing is provided with a fixing hole, correspondingly, the other side of the second half housing is provided with a first screw, and the first screw is connected to the fixing hole for fixation in a screwed manner.

4. The connecting box for a road lamp according to claim 3, wherein the first half housing is provided with a plurality of second screws for being fixed to the lamp body.

5. A connecting box for a road lamp, comprising:

a first half housing for mounting and connection to a lamp body and a second half housing for mounting and connection to a lamp post;

wherein the second half housing and the first half housing are spliced together in an openable manner and enclose to form an accommodating cavity, and a quick wire connector is arranged in the accommodating cavity;

wherein a wire passing hole is provided in an outer side surface of the first half housing, the wire passing hole is in communication with the accommodating cavity, and a first waterproof ring is arranged at a periphery of the wire passing hole.

6. The connecting box for a road lamp according to claim 1, wherein a second waterproof ring is sandwiched between the second half housing and the first half housing.

7. The connecting box for a road lamp according to claim 1, wherein the second half housing is provided with waterproof connectors, and the waterproof connectors are in communication with the accommodating cavity.

* * * * *